United States Patent
Rached

(10) Patent No.: US 11,359,122 B2
(45) Date of Patent: Jun. 14, 2022

(54) METHOD FOR HEATING AND/OR AIR-CONDITIONING IN A VEHICLE

(71) Applicant: Arkema France, Colombes (FR)

(72) Inventor: Wissam Rached, Chaponost (FR)

(73) Assignee: ARKEMA FRANCE, Colombes (FR)

(*) Notice: Subject to any disclaimer, the term of this patent is extended or adjusted under 35 U.S.C. 154(b) by 363 days.

(21) Appl. No.: 16/494,445

(22) PCT Filed: Mar. 20, 2018

(86) PCT No.: PCT/FR2018/050671
§ 371 (c)(1),
(2) Date: Sep. 16, 2019

(87) PCT Pub. No.: WO2018/172689
PCT Pub. Date: Sep. 27, 2018

(65) Prior Publication Data
US 2021/0115313 A1    Apr. 22, 2021

(30) Foreign Application Priority Data

Mar. 21, 2017 (FR) ...................... 1752304

(51) Int. Cl.
*C09K 5/04* (2006.01)
*B60H 1/32* (2006.01)

(52) U.S. Cl.
CPC .......... *C09K 5/045* (2013.01); *B60H 1/3204* (2013.01); *C09K 2205/122* (2013.01); *C09K 2205/126* (2013.01); *C09K 2205/22* (2013.01)

(58) Field of Classification Search
CPC .............. C09K 5/045; C09K 2205/122; C09K 2205/126; C09K 2205/22; B60H 1/3204; B60H 1/00907
See application file for complete search history.

(56) References Cited

U.S. PATENT DOCUMENTS

| | | |
|---|---|---|
| 2,438,120 A | 3/1948 | Freygang |
| 2,834,748 A | 5/1958 | Bailey et al. |
| 2,846,458 A | 8/1958 | Haluska |
| 2,917,480 A | 12/1959 | Bailey et al. |
| 5,056,990 A | 10/1991 | Nakajima |

(Continued)

FOREIGN PATENT DOCUMENTS

| | | |
|---|---|---|
| CN | 101297016 A | 10/2008 |
| CN | 101880519 A | 11/2010 |
| EP | 0 509 673 A1 | 10/1992 |
| EP | 0 811 670 A1 | 12/1997 |

(Continued)

OTHER PUBLICATIONS

Roof, Steven, et al., "The Climate of Death Valley, California," *American Meteorological Society*, Dec. 2003, 1725-1739, USA.

(Continued)

*Primary Examiner* — Emmanuel E Duke
(74) *Attorney, Agent, or Firm* — Buchanan Ingersoll & Rooney P.C.

(57) ABSTRACT

A method for heating and/or air-conditioning in a motor vehicle interior by means of a reversible refrigeration loop in which a refrigerant fluid circulates, said fluid including: between 4 and 6 wt. % of difluoromethane (HFC-32); between 2.5 and 3.5 wt. % of pentafluoroethane (HFC-125); and between 91 and 93.5 wt. % of tetrafluoropropene, preferably 2,3,3,3-tetrafluoropropene.

21 Claims, 7 Drawing Sheets

(56) References Cited

U.S. PATENT DOCUMENTS

| | | | |
|---|---|---|---|
| 5,290,466 A | 3/1994 | Shiflett | |
| 5,363,674 A | 11/1994 | Powell | |
| 5,399,631 A | 3/1995 | Egawa et al. | |
| 5,497,631 A | 3/1996 | Lorentzen et al. | |
| 5,643,492 A | 7/1997 | Shiflett | |
| 5,688,432 A | 11/1997 | Pearson | |
| 5,722,256 A | 3/1998 | Shiflett | |
| 5,744,052 A | 4/1998 | Bivens | |
| 6,454,960 B1 | 9/2002 | Sunaga et al. | |
| 6,508,950 B1 | 1/2003 | Lim et al. | |
| 6,589,355 B1 | 7/2003 | Thomas et al. | |
| 6,655,160 B2 | 12/2003 | Roberts | |
| 7,569,170 B2 | 8/2009 | Minor | |
| 7,914,696 B2 | 3/2011 | Low et al. | |
| 8,070,977 B2 | 12/2011 | Rached | |
| 8,075,798 B2 | 12/2011 | Rached | |
| 8,142,680 B2 | 3/2012 | Rached | |
| 8,246,850 B2 | 8/2012 | Rached | |
| 8,443,624 B2 | 5/2013 | Yamashita et al. | |
| 8,496,845 B2 | 7/2013 | Tsuchiya et al. | |
| 8,709,275 B2 | 4/2014 | Yana Motta et al. | |
| 8,980,118 B2 | 3/2015 | Yana Motta et al. | |
| 8,992,793 B2 | 3/2015 | Sato et al. | |
| 9,057,010 B2 | 6/2015 | Rached | |
| 9,359,540 B2 | 6/2016 | Rached | |
| 9,488,398 B2 | 11/2016 | Rached | |
| 9,556,372 B2 | 1/2017 | Kujak et al. | |
| 9,598,621 B2 | 3/2017 | Minor et al. | |
| 9,683,156 B2 | 6/2017 | Rached | |
| 9,752,069 B2 | 9/2017 | Boussand | |
| 10,113,093 B2 | 10/2018 | Rached | |
| 10,308,853 B2 | 6/2019 | Andre et al. | |
| 2006/0025322 A1 | 2/2006 | Wilson et al. | |
| 2006/0243944 A1 | 11/2006 | Minor et al. | |
| 2006/0243945 A1 | 11/2006 | Minor et al. | |
| 2006/0269484 A1 | 11/2006 | Knopeck et al. | |
| 2007/0108403 A1 | 5/2007 | Sievert et al. | |
| 2008/0230738 A1 | 9/2008 | Minor et al. | |
| 2009/0158771 A1 | 6/2009 | Low et al. | |
| 2009/0249864 A1 | 10/2009 | Minor et al. | |
| 2009/0250650 A1 | 10/2009 | Minor et al. | |
| 2009/0278072 A1 | 11/2009 | Minor et al. | |
| 2009/0305876 A1 | 12/2009 | Singh et al. | |
| 2009/0314015 A1 | 12/2009 | Minor et al. | |
| 2010/0044619 A1 | 2/2010 | Hulse et al. | |
| 2010/0044620 A1 | 2/2010 | Rached | |
| 2010/0122545 A1 | 5/2010 | Minor et al. | |
| 2011/0079042 A1 | 4/2011 | Yamashita et al. | |
| 2011/0095224 A1 | 4/2011 | Rached | |
| 2011/0108756 A1* | 5/2011 | Tsuchiya | C09K 5/045 252/68 |
| 2011/0162410 A1 | 7/2011 | Low | |
| 2011/0173997 A1 | 7/2011 | Low et al. | |
| 2011/0186772 A1 | 8/2011 | Rached | |
| 2011/0219791 A1* | 9/2011 | Rached | B60H 1/00907 62/238.7 |
| 2011/0219792 A1 | 9/2011 | Rached | |
| 2011/0219815 A1 | 9/2011 | Yana Motta et al. | |
| 2011/0240254 A1 | 10/2011 | Rached | |
| 2011/0284181 A1 | 11/2011 | Rached | |
| 2011/0289748 A1 | 12/2011 | Singh et al. | |
| 2012/0049104 A1 | 3/2012 | Rached | |
| 2012/0056123 A1 | 3/2012 | Rached | |
| 2012/0097885 A9 | 4/2012 | Hulse et al. | |
| 2012/0144857 A1 | 6/2012 | Rached | |
| 2012/0151959 A1 | 6/2012 | Rached | |
| 2012/0153213 A1 | 6/2012 | Rached | |
| 2012/0159982 A1 | 6/2012 | Rached | |
| 2012/0161064 A1 | 6/2012 | Rached | |
| 2012/0167615 A1 | 7/2012 | Rached | |
| 2012/0255316 A1 | 10/2012 | Andre et al. | |
| 2012/0312048 A1 | 12/2012 | Poole et al. | |
| 2013/0055733 A1 | 3/2013 | Rached | |
| 2013/0055738 A1* | 3/2013 | Rached | F25B 45/00 62/77 |
| 2013/0055739 A1 | 3/2013 | Rached | |
| 2013/0061613 A1 | 3/2013 | Rached | |
| 2013/0096128 A1 | 4/2013 | Bebbington et al. | |
| 2013/0096218 A1 | 4/2013 | Rached et al. | |
| 2013/0145778 A1 | 6/2013 | Yana Motta et al. | |
| 2013/0193369 A1 | 8/2013 | Low | |
| 2013/0255284 A1 | 10/2013 | Rached | |
| 2014/0075969 A1 | 3/2014 | Guerin et al. | |
| 2014/0137578 A1 | 5/2014 | Yana Motta et al. | |
| 2014/0223927 A1 | 8/2014 | Pottker et al. | |
| 2014/0223935 A1* | 8/2014 | Rached | C09K 5/045 432/29 |
| 2014/0331697 A1 | 11/2014 | Minor et al. | |
| 2015/0135765 A1 | 5/2015 | Yana Motta et al. | |
| 2015/0152307 A1 | 6/2015 | Rached | |
| 2015/0184052 A1 | 7/2015 | Rached | |
| 2015/0291869 A1 | 10/2015 | Boussand | |
| 2016/0145481 A1 | 5/2016 | Kujak et al. | |
| 2016/0215192 A1 | 7/2016 | Minor et al. | |
| 2016/0222272 A1 | 8/2016 | Rached | |
| 2016/0252283 A1 | 9/2016 | Rached | |
| 2017/0260437 A1 | 9/2017 | Rached | |
| 2019/0016937 A1 | 1/2019 | Andre et al. | |
| 2021/0115312 A1 | 4/2021 | Rached | |
| 2021/0261841 A1 | 8/2021 | Itano | |

FOREIGN PATENT DOCUMENTS

| | | |
|---|---|---|
| EP | 2 767 569 A1 | 8/2014 |
| FR | 2959998 A1 | 11/2011 |
| JP | 2011-226728 A | 11/2011 |
| KR | 2001-0044992 A | 6/2001 |
| WO | WO 2004/037913 A2 | 5/2004 |
| WO | WO 2004/037913 A3 | 5/2004 |
| WO | WO 2005/105947 A2 | 11/2005 |
| WO | WO 2005/105947 A3 | 11/2005 |
| WO | WO 2007/002625 A2 | 1/2007 |
| WO | WO 2007/002625 A3 | 1/2007 |
| WO | WO 2007/053697 A2 | 5/2007 |
| WO | WO 2007/053697 A3 | 5/2007 |
| WO | WO 2007/126414 A2 | 11/2007 |
| WO | WO 2007/126414 A3 | 11/2007 |
| WO | WO 2008/107623 A2 | 9/2008 |
| WO | WO 2008/107623 A3 | 9/2008 |
| WO | 2008107623 A3 | 11/2008 |
| WO | WO 2009/047542 A1 | 4/2009 |
| WO | WO 2009/104784 A1 | 8/2009 |
| WO | WO 2009/151669 A1 | 12/2009 |
| WO | WO 2009/154149 A1 | 12/2009 |
| WO | WO 2010/002014 A1 | 1/2010 |
| WO | WO 2010/002020 A1 | 1/2010 |
| WO | 2010058126 A1 | 5/2010 |
| WO | WO 2010/059677 A2 | 5/2010 |
| WO | WO 2010/059677 A3 | 5/2010 |
| WO | WO 2010/064005 A1 | 6/2010 |
| WO | WO 2010/129461 A2 | 11/2010 |
| WO | WO 2010/129461 A3 | 11/2010 |
| WO | WO 2010/129920 A1 | 11/2010 |
| WO | WO 2011/023923 A1 | 3/2011 |
| WO | WO 2011/073934 A1 | 6/2011 |
| WO | WO 2011/077088 A1 | 6/2011 |
| WO | WO 2011/107698 A2 | 9/2011 |
| WO | WO 2011/107698 A3 | 9/2011 |
| WO | WO 2011/141654 A2 | 11/2011 |
| WO | WO 2011/141654 A3 | 11/2011 |
| WO | WO 2011/141656 A2 | 11/2011 |
| WO | WO 2011/141656 A3 | 11/2011 |
| WO | WO 2012/069725 A1 | 5/2012 |
| WO | WO 2012/150391 A1 | 11/2012 |
| WO | WO 2012/177742 A2 | 12/2012 |
| WO | WO 2014/081539 A1 | 5/2014 |

OTHER PUBLICATIONS

U.S. Appl. No. 16/494,413, Wissam Rached, filed Sep. 16, 2019.
U.S. Appl. No. 16/135,566, David Andre, Béatrice Boussand, Wissam Rachen, filed Sep. 19, 2018, (cited herein as US Patent Application Publication No. 2019/0016937 A1 of Jan. 17, 2019).

(56) References Cited

OTHER PUBLICATIONS

U.S. Appl. No. 16/494,413, Rached.
International Search Report and Written Opinion issued in PCT/FR2018/050669 (English and French language versions) dated May 29, 2018, 16 pages, European Patent Office, Rijswijk, NL.
Takizawa, K., et al., "Flammability Assessment of $CH_2=CFCF_3$: Comparison with Fluoroalkenes and Fluoroalkanes", Journal of Hazardous Materials, vol. 172, No. 2-3, Aug. 18, 2009, pp. 1329-1338, XP026719989, Elsevier B.V.
Takizawa, K., et al., "Flammability Assessment of $CH_2=CFCF_3$ (R-1234yf) and its Mixtures with $CH_2F_2$ (R-32); 2010 International Symposium on Next-generation Air Conditioning and Refrigeration Technology," Tokyo, JP, Feb. 17-19, 2010, pp. 1-8.
"Definitions: Humidity," Healthy Heating, May 18, 2008, 4 pages, XP002594956, http://web.archive.org/web/20080518174151/http://www.healthyheating.com/Thermal_Comfort_Working_Copy/Definitions/humidity.htm.
Donnelly, M. K., et al., "The Flammability of R-245ca", ASHRAE Transactions: Symposia (American Society of Heating, Refrigerating and Air-Conditioning Engineers), 1999, 10 pages, including pp. 1169-1176, ASHRAE, USA.
Van Den Schoor, Filip, University Thesis, "Influence of Pressure and Temperature on Flammability Limits of Combustible Gases in Air," May 2007, 228 pages, Katholieke Universiteit Leuven—Faculteit Ingenieurswetenschappen, Leuven, BE, ISBN 978-90-5682-813-4.
Rached, Wissam, U.S. Appl. No. 16/494,413 entitled "Tetrafluoropropene-based Composition," filed Sep. 16, 2019.
International Search Report (PCT/ISA/210) dated Jun. 12, 2018, by the European Patent Office as the International Searching Authority for International Application No. PCT/FR2018/050671.
Written Opinion (PCT/ISA/237) dated Jun. 12, 2018, by the European Patent Office as the International Searching Authority for International Application No. PCT/FR2018/050671.
Notice of Reasons for Refusal dated Mar. 23, 2022, issued in JP Patent Application No. 2019-551456, Japan Patent Office, Tokyo, JP, 8 pages including English-language machine translation.

* cited by examiner

METHOD FOR HEATING AND/OR AIR-CONDITIONING IN A VEHICLE

TECHNICAL FIELD

The present invention relates to a process for heating and/or air conditioning a motor vehicle passenger compartment.

BACKGROUND

In motor vehicles, the heat engine comprises a circuit for circulation of a heat-exchange fluid which is used for the cooling of the engine and also for the heating of the passenger compartment. To this end, the circuit comprises in particular a pump and a unit heater in which circulates a stream of air which recovers the heat stored by the heat-exchange fluid in order to heat the passenger compartment.

Furthermore, an air-conditioning system intended to cool the passenger compartment of a motor vehicle comprises an evaporator, a compressor, a condenser, an expansion valve and a fluid capable of changing (liquid/gas) states commonly denoted refrigerant. The compressor, directly driven by the engine of the vehicle using a belt and a pulley, compresses the refrigerant, forcing it back under high pressure and high temperature toward the condenser. The condenser, by virtue of forced ventilation, brings about the condensation of the gas which arrives in the gaseous state at high pressure and high temperature. The condenser liquefies the gas by virtue of the lowering in temperature of the air which passes through it. The evaporator is a heat exchanger which removes heat from the air which will be blown into the passenger compartment. The expansion valve makes it possible to regulate the flow rate for entry of the gas into the loop via a modification of passage section depending on the temperature and on the pressure in the evaporator. Thus, the hot air coming from the outside is cooled by passing through the evaporator.

The refrigerant widely used in motor vehicle air conditioning is 1,1,1,2-tetrafluoroethane (HFC-134a).

The document WO 2008/107623 describes a system for energy management of a motor vehicle comprising a reversible refrigerating loop with circulation of a refrigerant, means for inversion of the operating cycle of the refrigerating loop which can be moved between a position in refrigerating mode and a position in heat pump mode, at least one first source capable of recovering the energy of the refrigerant, and at least one second source capable of evaporating the refrigerant subsequent to the expansion of said refrigerant from the liquid state to the two-phase state, the inversion means being capable of making possible a flow of the refrigerant from the first recovery source in the direction of at least one evaporation source, when they are in a position identical to that corresponding to the heat pump mode.

However, with HFC-134a as refrigerant in the system as described in the document WO 2008/107623, when the external temperature is low, for example in the vicinity of −10° C., a negative pressure begins to be formed in the evaporator even before the compressor is started. This negative pressure, which results in an infiltration of air into the system, promotes corrosion phenomena and the degradation of the components, such as compressor, exchanger and expansion valve.

SUMMARY

It is an objective of the present invention to limit, indeed even to prevent, air from entering the evaporator of the refrigerating loop on starting up the compressor and/or to improve the efficiency of the refrigerating loop.

A subject matter of the present invention is thus a process for heating and/or air conditioning a motor vehicle passenger compartment using a reversible refrigerating loop, in which a refrigerant circulates, comprising a first heat exchanger, an expansion valve, a second heat exchanger, a compressor and means for inversion of the operation of the reversible refrigerating loop, characterized in that the refrigerant comprises (preferably consists of):
- from 4% to 6% by weight of difluoromethane (HFC-32);
- from 2.5% to 3.5% by weight of pentafluoroethane (HFC-125); and
- from 91% to 93.5% by weight of tetrafluoropropene.

In particular, the abovementioned process for heating and/or air conditioning a motor vehicle passenger compartment comprises a stage of circulation of said refrigerant as defined above, namely comprising
- from 4% to 6% by weight of difluoromethane (HFC-32);
- from 2.5% to 3.5% by weight of pentafluoroethane (HFC-125); and
- from 91% to 93.5% by weight of tetrafluoropropene.

Preferably, the heating and/or air-conditioning process comprises at least one of the following stages: a stage of evaporation of the refrigerant, a stage of compression of said refrigerant, a stage of condensation of said refrigerant and a stage of expansion of said refrigerant.

According to the invention, the percentages by weight are with respect to the total weight of said refrigerant.

Unless otherwise mentioned, throughout the patent application, the proportions of compounds shown are given as percentages by weight.

In the context of the invention, "HFO-1234yf" refers to 2,3,3,3-tetrafluoropropene.

In the context of the invention, "HFO-1234ze" refers to 1,3,3,3-tetrafluoropropene, and includes the cis isomer, the trans isomer and their mixtures.

According to another embodiment, the refrigerant is essentially composed of, preferably consists of:
- from 4% to 6% by weight of difluoromethane (HFC-32);
- from 2.5% to 3.5% by weight of pentafluoroethane (HFC-125); and
- from 91% to 93.5% by weight of tetrafluoropropene.

Impurities can be present in such refrigerants, in a proportion, for example, of less than 1%, preferably of less than 0.5%, preferably of less than 0.1%, preferentially of less than 0.05% and in particular of less than 0.01%. These impurities do not have a significant impact on the properties of said refrigerants.

According to one embodiment, the refrigerant comprises (preferably consists of):
- from 4.5% to 5.5% by weight of difluoromethane;
- from 2.5% to 3.5% by weight of pentafluoroethane; and
- from 91% to 93% by weight of tetrafluoropropene.

According to one embodiment, the refrigerant comprises (preferably consists of):
- from 4.5% to 5.5% by weight of difluoromethane;
- from 2.5% to 3.5% by weight of pentafluoroethane; and
- from 91.5% to 93% by weight of tetrafluoropropene.

According to one embodiment, the refrigerant comprises (preferably consists of):
- from 4.5% to 5.5% by weight of difluoromethane;
- from 2.5% to 3.5% by weight of pentafluoroethane; and
- from 91% to 92% by weight of tetrafluoropropene.

According to one embodiment, the refrigerant comprises (preferably consists of):

from 4.5% to 5.5% by weight of difluoromethane;
from 3% to 3.5% by weight of pentafluoroethane; and
from 91% to 92% by weight of tetrafluoropropene.

According to one embodiment, the tetrafluoropropene of the refrigerant is chosen from 1,3,3,3-tetrafluoropropene and 2,3,3,3-tetrafluoropropene; preferably, the tetrafluoropropene is 2,3,3,3-tetrafluoropropene.

According to one embodiment, the abovementioned refrigerant is chosen from the group consisting of the following refrigerants:

5% by weight of difluoromethane, 3.3% by weight of pentafluoroethane and 91.7% by weight of tetrafluoropropene, in particular of 2,3,3,3-tetrafluoropropene;

5% by weight of difluoromethane, 3% by weight of pentafluoroethane and 92% by weight of tetrafluoropropene, in particular of 2,3,3,3-tetrafluoropropene;

5% by weight of difluoromethane, 3.1% by weight of pentafluoroethane and 91.9% by weight of tetrafluoropropene, in particular of 2,3,3,3-tetrafluoropropene;

5% by weight of difluoromethane, 3.2% by weight of pentafluoroethane and 91.8% by weight of tetrafluoropropene, in particular of 2,3,3,3-tetrafluoropropene;

6% by weight of difluoromethane, 3% by weight of pentafluoroethane and 91% by weight of tetrafluoropropene, in particular of 2,3,3,3-tetrafluoropropene;

6% by weight of difluoromethane, 3.1% by weight of pentafluoroethane and 90.9% by weight of tetrafluoropropene, in particular of 2,3,3,3-tetrafluoropropene; and 6% by weight of difluoromethane, 2.5% by weight of pentafluoroethane and 91.5% by weight of tetrafluoropropene, in particular of 2,3,3,3-tetrafluoropropene.

According to one embodiment, the refrigerant has a GWP of less than 150, preferably of less than or equal to 140, in particular of less than or equal to 130. The GWP can be calculated according to the instructions provided by the 4$^{th}$ report of the Intergovernmental Panel on Climate Change (IPCC). The GWP of the mixtures is in particular calculated as a function of the concentration by weight and the GWP of each component. The GWP values of the pure compounds are typically listed in the European F-Gas Directive (Regulation (EU) No. 517/2014 of the European Parliament and of the Council, of Apr. 16, 2014).

The abovementioned refrigerants are advantageously nonflammable or only slightly flammable.

The abovementioned refrigerants advantageously have a lower flammability limit of greater than 285 g/m$^3$, preferably of greater than or equal to 287 g/m$^3$, in particular of greater than or equal to 290 g/m$^3$.

The abovementioned refrigerant advantageously results in a WCFF composition having a lower flammability limit of greater than 100 g/m$^3$, preferably of greater than or equal to 105 g/m$^3$, in particular of greater than or equal to 110 g/m$^3$.

The abovementioned refrigerants, the corresponding WCFs and WCFFs, have a heat of combustion (HOC) of less than 19 000 kJ/m$^3$. The heat of combustion according to the invention is defined and determined as indicated in the standard ASHRAE 34-2013. The "lower flammability limit" is defined in the standard ASHRAE 34-2013 as being the minimum concentration of a composition capable of propagating a flame through a homogeneous mixture of the composition and of air, under test conditions specified in the standard ASTM E681-04. It can be given, for example, in kg/m$^3$ or in % vol.

A "WCF" (worst case of formulation for flammability) composition is defined in the standard ASHRAE 34-2013 as being a formulation composition, the flame propagation rate of which is the highest. This composition is very close to the nominal composition (said nominal composition corresponding, in the context of the invention, to a refrigerant according to the invention) with a degree of tolerance.

A "WCFF" (worst case of fractionation for flammability) composition is defined in the standard ASHRAE 34-2013 as being the composition, the flame propagation rate of which is the highest. This composition is determined following a method well defined in the same standard.

In the context of the present invention, the flammability, the flame propagation rate and the lower flammability limit are defined and determined according to the test appearing in the standard ASHRAE 34-2013, which refers to the standard ASTM E681 as to the equipment used.

As regards the flame propagation rate, the method of the tests described in the standard ASHRAE 34-2013 is that developed in the thesis by T. Jabbour, "Classification de l'inflammabilité des fluides frigorigènes basée sur la vitesse fondamentale de flamme" [Classification of the flammability of refrigerants based on the fundamental flame velocity] under the direction of Denis Clodic. Thesis, Paris, 2004. The experimental device uses in particular the vertical glass tube method (tube number 2, length 150 cm, diameter 40 cm). The use of two tubes makes it possible to carry out two tests with the same concentration at the same time. The tubes are in particular equipped with tungsten electrodes; the latter are placed at the bottom of each tube, 6.35 mm (¼ inch) apart, and are connected to a 15 kV and 30 mA generator.

The different compositions tested are described as nonflammable or flammable as such, according to the criteria defined in the standard ASHRAE 34-2013.

The abovementioned refrigerant advantageously has a flame propagation rate of less than 2 cm/s, preferably of less than or equal to 1.7 cm/s, preferentially of less than or equal to 1.6 cm/s, advantageously of less than or equal to 1.5 cm/s.

The abovementioned refrigerant is advantageously classified as 2 L according to the standard ASHRAE 34-2013. Following this standard, the 2 L classification requires a flame propagation rate of less than 10 cm/s.

The abovementioned refrigerants advantageously exhibit a good compromise between good energy performance qualities, low or zero flammability and low GWP, preferably a GWP of less than 150.

Due to their low flammability, the abovementioned refrigerants are advantageously safer when they are used in the process of the invention.

The abovementioned refrigerants can be prepared by any known process, such as, for example, by simple mixing of the different compounds with one another.

The term "heat-transfer compound", respectively "heat-transfer fluid" or "refrigerant", is understood to mean a compound, respectively a fluid, capable of absorbing heat by evaporating at low temperature and low pressure and of discharging heat by condensing at high temperature and high pressure, in a vapor compression circuit. Generally, a heat-transfer fluid can comprise just one, two, three or more than three heat-transfer compounds.

The refrigerant according to the invention can comprise stabilizing agents. Mention may in particular be made, among stabilizing agents, of nitromethane, ascorbic acid, terephthalic acid, azoles, such as tolutriazole or benzotriazole, phenolic compounds, such as tocopherol, hydroquinone, (t-butyl)hydroquinone or 2,6-di(tert-butyl)-4-methylphenol, epoxides (alkyl, which is optionally fluorinated or perfluorinated, or alkenyl or aromatic), such as n-butyl glycidyl ether, hexanediol diglycidyl ether, allyl glycidyl ether or butylphenyl glycidyl ether, phosphites, phosphonates, thiols and lactones.

According to the invention, the means for inversion of the operation of the reversible refrigerating loop are means for inversion of the operation of the refrigerating loop between a position in refrigerating mode and a position in heat pump mode.

The abovementioned inversion means can be means for modification of the course of the refrigerant in the reversible refrigerating loop, or means for inversion of the direction of circulation of the refrigerant in said loop.

The abovementioned inversion means can be a four-way valve, a switchover valve, a shut-off (on/off) valve, an expansion valve or their combinations.

For example, during the inversion of the mode of operation of the refrigerating loop, the role of a heat exchanger can be changed: for example, a heat exchanger can act as a condenser in a refrigerating mode or as an evaporator in a heat pump mode.

The reversible refrigerating loop can typically contain pipes, tubes, hoses, tanks or others, in which the refrigerant circulates, between the different exchangers, expansion valves, other valves, and the like.

According to the mode of operation of the loop, refrigerating or heat pump, the first heat exchanger can act as evaporator or as energy recuperator. It is the same for the second heat exchanger. In refrigerating mode, the second exchanger makes possible the cooling of the stream of air intended to be forced inside the passenger compartment of the motor vehicle. In heat pump mode, the second exchanger makes it possible to heat the stream of air intended for the passenger compartment of the motor vehicle.

The first and second heat exchangers are of the air/refrigerant type.

In the process according to the present invention, the refrigerating loop can be thermally coupled, through the heat exchangers, with the cooling circuit of the engine and/or of the electronic circuit. Thus, the loop can comprise at least one heat exchanger traversed both by the refrigerant and by a heat-exchange fluid, in particular the air or the water of the cooling circuit of the heat engine or electric motor, and/or of the electronic circuit.

According to an alternative form of the process, the first heat exchanger is traversed both by the refrigerant and by exhaust gases resulting from the heat engine of the motor vehicle; these can be in thermal communication with a heat-exchange fluid circuit.

According to an alternative form of the process, the first heat exchanger is traversed both by the refrigerant and by the heat resulting from the battery or from the electronic circuit of the motor vehicle, in particular of the electric motor vehicle.

The refrigerating loop in the process according to the present invention can comprise, as a bypass, at least one heat exchanger in thermal communication with a stream of air, intended to be admitted inside the heat engine of the motor vehicle, or with exhaust gases resulting from the motor vehicle heat engine, and/or with the heat resulting from the electric motor and/or from the electronic circuit of the electric motor vehicle.

The process according to the present invention is very particularly suitable when the external temperature is less than 3° C., preferably less than or equal to −2° C., preferentially less than or equal to −7° C., in particular less than or equal to −12° C., more preferentially still less than or equal to −17° C., for example less than or equal to −22° C., and advantageously less than −27° C., and preferably greater than or equal to −29° C.

The process according to the present invention is very particularly suitable when the temperature at the evaporator is less than 0° C., preferably less than or equal to −5° C., preferentially less than or equal to −10° C., in particular less than or equal to −15° C., more preferentially still less than or equal to −20° C., for example less than or equal to −25° C., and advantageously less than −30° C., and preferably greater than or equal to −32° C.

The process according to the present invention may be suitable simultaneously for motor vehicles having a heat engine, for motor vehicles having an electric motor and for hybrid motor vehicles, the latter being designed to operate alternately on a heat engine and an electric motor. It makes it possible to exert the best management over the contributions of energy according to the weather conditions (hot or cold) both for the passenger compartment and for the battery and in particular to supply heat or cold to the battery through a heat-exchange fluid circuit.

The reversible refrigerating loop, in which the refrigerant as defined above circulates, installed in motor vehicles is particularly suitable for the recovery of energy from the heat engine and/or from the electric battery and/or from the electronic circuit, of use for the heating of the passenger compartment and the engine/motor during a cold-start phase. This reversible refrigerating loop, when it comprises a pump, can operate in Rankine mode (that is to say, the compressor operates as a turbine) in order to upgrade the heat energy produced by the heat engine and subsequently transported by the refrigerant, after heat transfer.

The present invention also relates to the use of a reversible refrigerating loop in which circulates a refrigerant comprising (preferably consisting of):

from 4% to 6% by weight of difluoromethane (HFC-32);
from 2.5% to 3.5% by weight of pentafluoroethane (HFC-125); and
from 91% to 93.5% by weight of tetrafluoropropene;

for heating and/or air conditioning a motor vehicle passenger compartment;

said refrigerating loop comprising a first heat exchanger, an expansion valve, a second heat exchanger, a compressor and means for inversion of the operation of the reversible refrigerating loop.

Another subject matter of the invention is a device comprising the refrigerating loop as described above; in particular, the refrigerating loop comprises a first heat exchanger, an expansion valve, a second heat exchanger, a compressor and means for inversion of the operation of the reversible refrigerating loop.

DETAILED DESCRIPTION

Figure 1:
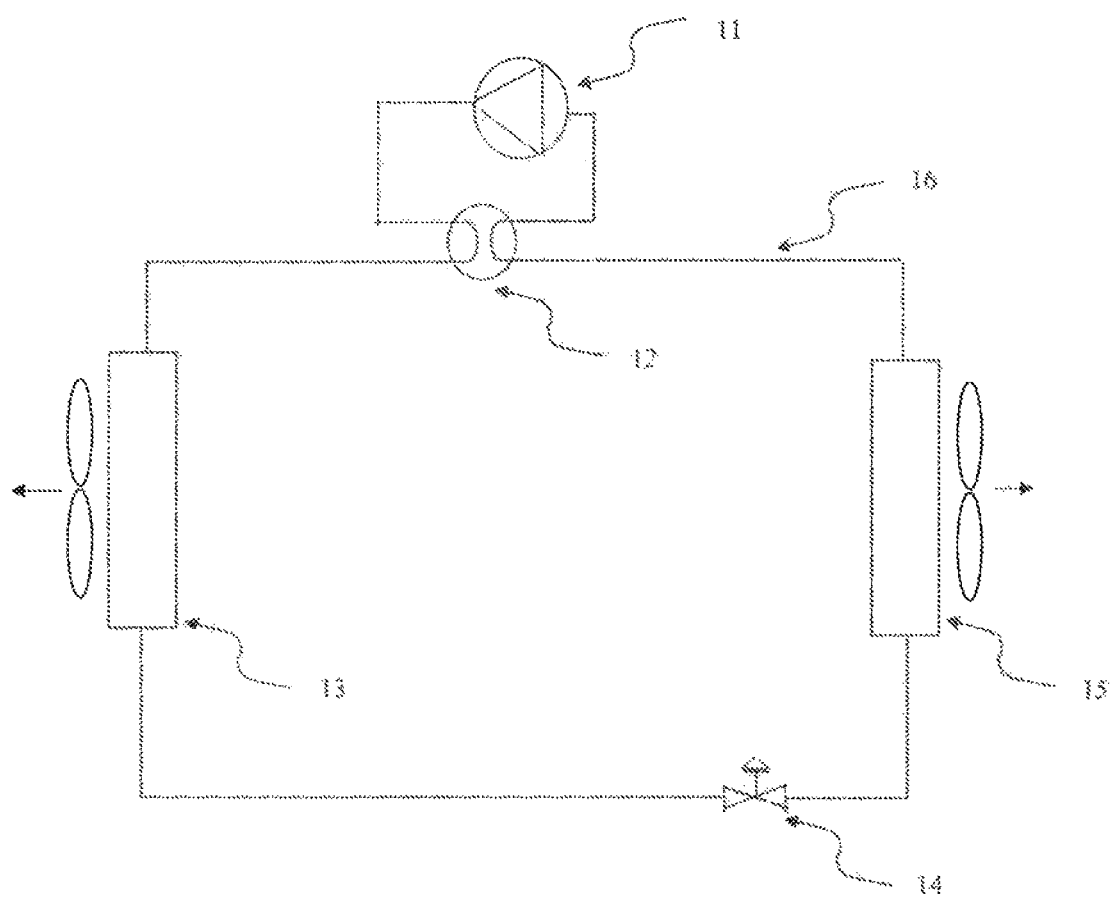
FIG. 1 shows a refrigerating loop according to a first embodiment of the invention.

According to a first embodiment of the invention, represented diagrammatically by FIG. 1, the refrigerating loop (16) comprises a first heat exchanger (13), an expansion valve (14), a second heat exchanger (15), a compressor (11) and a four-way valve (12). The first and second heat exchangers are of the air/refrigerant type. The first heat exchanger (13) is traversed by the refrigerant of the loop (16) and by the stream of air introduced by a fan. A portion or all of this same stream of air can also pass through a heat exchanger of the cooling circuit of the engine/motor and/or of the electronic circuit (not represented in the figure). In the same way, the second exchanger (15) is traversed by a stream of air introduced by a fan. A portion or all of this stream of air can also pass through another heat exchanger of the cooling circuit of the engine/motor and/or of the electronic circuit (not represented in the figure). The direction of circulation of the air is a function of the mode of operation of the loop (16) and of the requirements of the heat engine or electric motor. Thus, when the heat engine or electric motor is in operation and the loop (16) in heat pump mode, the air can be heated by the exchanger of the cooling circuit of the heat engine or electric motor and then blown over the exchanger (13) in order to accelerate the evaporation of the refrigerant of the loop (16) and thus to improve the performance qualities of this loop.

The exchangers of the cooling circuit can be activated using valves according to the requirements of the heat engine or electric motor (heating of the air entering the engine/motor or upgrading of energy produced by this engine/motor).

In refrigerating mode, the refrigerant put in motion by the compressor (11) passes through, via the valve (12), the exchanger (13) acting as condenser (that is to say, gives off heat to the exterior), subsequently the expansion valve (14) and then the exchanger (15) acting as evaporator, thus making possible the cooling of the stream of air intended to be forced inside the passenger compartment of the motor vehicle.

The refrigerating mode according to the invention can typically be an air-conditioning mode.

In heat pump mode, the direction of flow of the refrigerant is inverted via the valve (12). The heat exchanger (15) acts as condenser, while the exchanger (13) acts as evaporator. The heat exchanger (15) then makes it possible to heat the stream of air intended for the passenger compartment of the motor vehicle.

Figure 2:
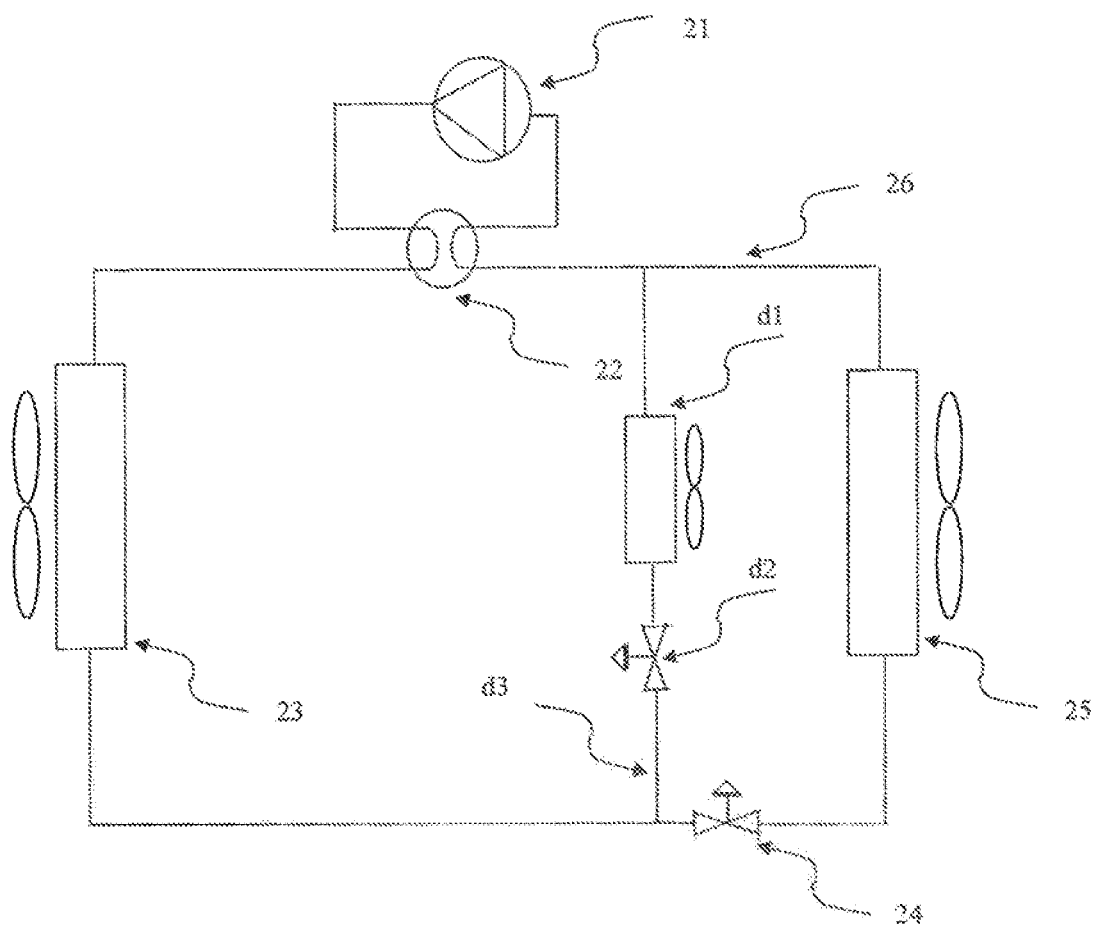
FIG. 2 shows a refrigerating loop according to a second embodiment of the invention.

According to a second embodiment of the invention, represented diagrammatically by FIG. 2, the refrigerating loop (26) comprises a first heat exchanger (23), an expansion valve (24), a second heat exchanger (25), a compressor (21), a four-way valve (22) and a bypass branch (d3) fitted, on the one hand, to the outlet of the exchanger (23) and, on the other hand, to the outlet of the exchanger (25), the circulation of the refrigerant being considered in refrigerating mode. This branch comprises a heat exchanger (d1) traversed by a stream of air or a stream of exhaust gas and an expansion valve (d2). The first and second heat exchangers (23 and 25) are of the air/refrigerant type. The first heat exchanger (23) is traversed by the refrigerant of the loop (26) and by the stream of air introduced by a fan. A portion or all of this same stream of air can also pass through a heat exchanger of the cooling circuit of the engine/motor or of the electronic circuit (not represented in the figure). In the same way, the second exchanger (25) is traversed by a stream of air introduced by a fan. A portion or all of this stream of air can also pass through another heat exchanger of the cooling circuit of the engine/motor or of the electronic circuit (not represented in the figure). The direction of circulation of the air is a function of the mode of operation of the loop (26) and of the requirements of the heat engine and/or electric motor. By way of example, when the heat engine and/or electric motor is in operation and the loop (26) in heat pump mode, the air can be heated by the exchanger of the cooling circuit of the heat engine and/or electric motor and then blown over the exchanger (23) in order to accelerate the evaporation of the refrigerant of the loop (26) and to improve the performance qualities of this loop.

The exchangers of the cooling circuit can be activated using valves according to the requirements of the heat engine or electric motor (heating of the air entering the engine/motor or upgrading of energy produced by this engine/motor).

The heat exchanger (d1) can also be activated according to the energy requirements, whether in refrigerating mode or in heat pump mode. Shut-off valves (not represented in FIG. 2) can be installed on the branch (d3) in order to activate or deactivate this branch.

The exchanger (d1) is traversed by a stream of air introduced by a fan. This same stream of air can pass through another heat exchanger of the cooling circuit of the engine/motor and/or of the electronic circuit and also other exchangers placed on the circuit of the exhaust gases, on the intake of air to the engine/motor or on the battery in electric or hybrid cars.

In refrigerating mode, the refrigerant is put in motion by the compressor (21) passes through, via the valve (22), the exchanger (23) acting as condenser (that is to say, gives off heat to the exterior), it subsequently passes through:

the expansion valve (24) and then the exchanger (25) acting as evaporator, thus making possible the cooling of the stream of air intended to be forced inside the passenger compartment of the motor vehicle; and/or the expansion valve (d2) and then the exchanger (d1) acting as evaporator, making possible, for example, the cooling of the stream of air intended to cool the electric motor and/or the electronic circuit and/or the battery.

In heat pump mode, the direction of flow of the refrigerant is inverted via the valve (22). The heat exchanger (25) and also the heat exchanger (d1) act as condensers, while the exchanger (23) acts as evaporator. The heat exchangers (25) and (d1) then make it possible to heat the stream of air intended for the passenger compartment of the motor vehicle and the battery.

Figure 3:
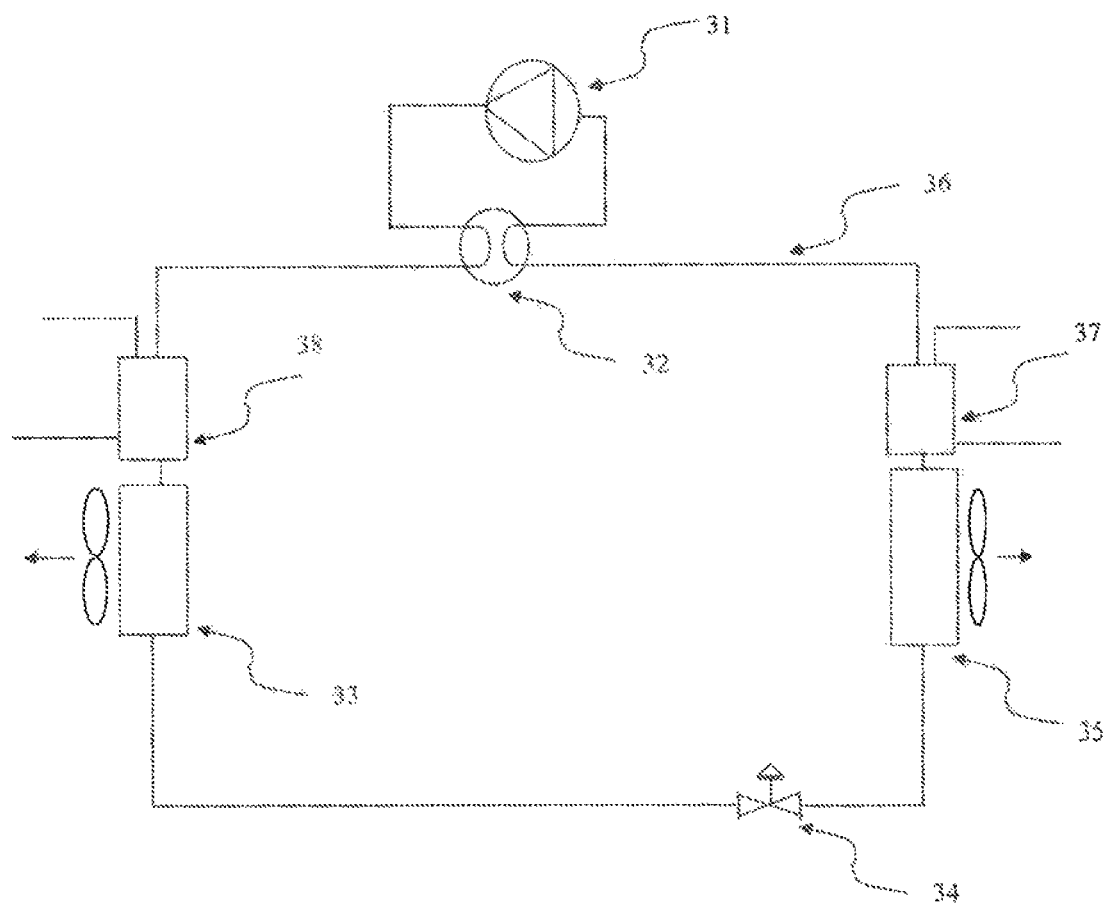
FIG. 3 shows a refrigerating loop according to a third embodiment of the invention.

According to a third embodiment of the invention, represented diagrammatically by FIG. 3, the refrigerating loop (36) comprises a first heat exchanger (33), an expansion valve (34), a second heat exchanger (35), a compressor (31) and a four-way valve (32). The first and second heat exchangers (33 and 35) are of the air/refrigerant type. The operation of the exchangers (33 and 35) is identical to the first embodiment presented in FIG. 1. At least one refrigerant/liquid exchanger (38 and/or 37) can be installed both on the circuit of the refrigerating loop (36) and on the cooling circuit of the heat engine or electric motor and/or battery, or on a secondary circuit of aqueous glycol solution.

FIG. 3 discloses an embodiment with two refrigerant/liquid heat exchangers (37 and 38). However, according to the abovementioned third embodiment, the refrigerating loop can comprise either the exchanger (37) or the exchanger (38) (mode not represented in FIG. 3).

The refrigerant/liquid exchanger (37 or 38) can be mounted in series with the heat exchanger (respectively 35 or 33) (as represented diagrammatically in FIG. 3), or in parallel with the latter. When it is mounted in series with the heat exchanger (35 or 33), the exchanger (37 or 38) can be placed before or after the exchanger (35 or 33) in the direction of circulation of the refrigerant.

The installation of the refrigerant/liquid exchangers without going through an intermediate gaseous fluid (air) contributes to the improvement in the heat exchanges in comparison with the air/refrigerant exchangers.

In refrigerating mode, the refrigerant put in motion by the compressor (31) passes through, via the four-way valve (32), optionally the exchanger (38), if present, acting as condenser (giving off heat through a secondary circuit to the air admitted to the heat engine and/or a system for upgrading energy), then the exchanger (33) acting as condenser (that is to say, gives off heat to the exterior), subsequently the expansion valve (34) and then the exchanger (35) acting as evaporator, thus making possible the cooling of the stream of air intended to be forced inside the passenger compartment of the motor vehicle, and optionally the exchanger (37), if present, acting as evaporator, thus making possible the cooling of a liquid which makes it possible, in its turn, to cool the air inside the passenger compartment of the vehicle via another liquid/air heat exchanger and/or to directly cool the battery.

In heat pump mode, the direction of flow of the refrigerant is inverted via the valve (32). The heat exchanger (37), if present, acts as condenser, the exchanger (35) also acts as condenser, while the exchanger (33) acts as evaporator, just like the exchanger (38), if present. The heat exchanger (35) then makes it possible to heat the stream of air intended for the passenger compartment of the motor vehicle. The heat exchanger (37) then makes it possible to heat a liquid which makes it possible, in its turn, to heat the stream of air intended for the passenger compartment of the motor vehicle via another liquid/air heat exchanger and/or to directly heat the battery.

Figure 4:
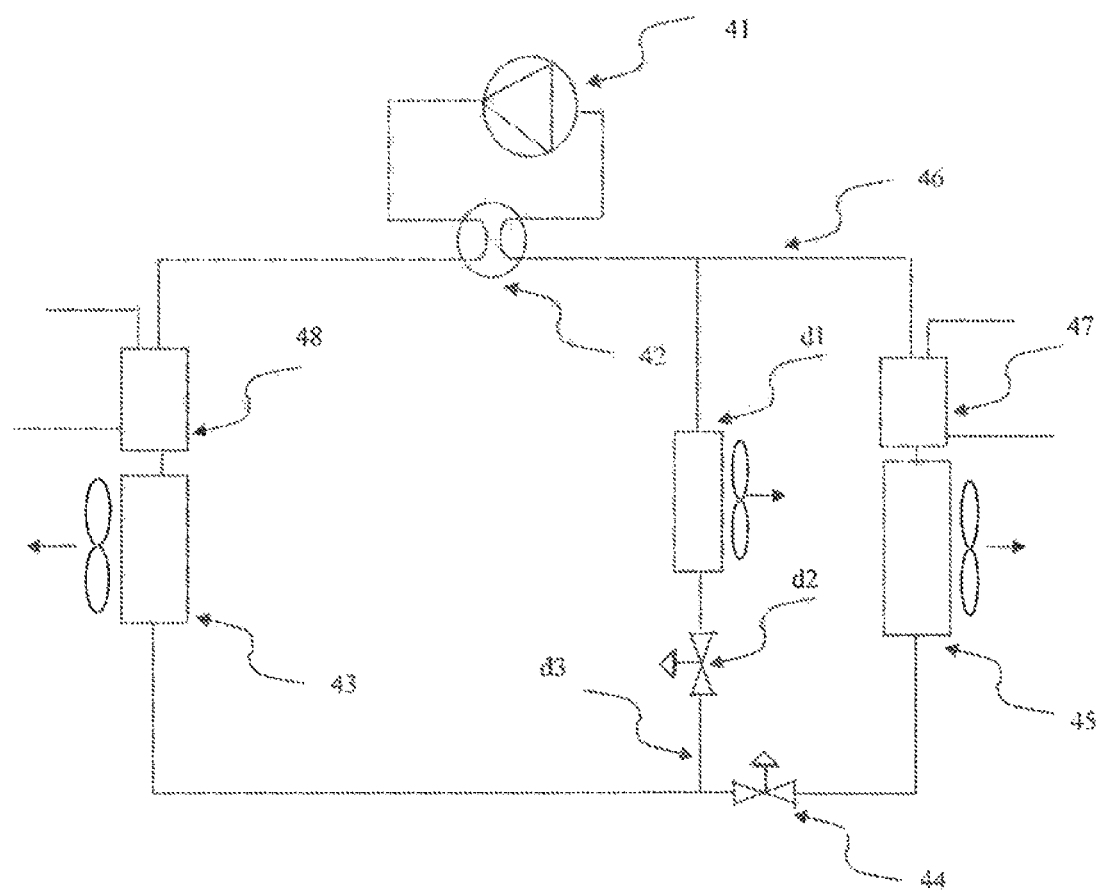
FIG. 4 shows a refrigerating loop according to a fourth embodiment of the invention.

According to a fourth embodiment of the invention, represented diagrammatically by FIG. 4, the refrigerating loop (46) comprises a first heat exchanger series (43 and 48), an expansion valve (44), a second heat exchanger series (45 and 47), a compressor (41) and a four-way valve (42). A bypass branch (d3) fitted, on the one hand, to the outlet of the exchanger (43) and, on the other hand, to the outlet of the exchanger (47), the circulation of the refrigerant being considered in refrigerating mode. This branch comprises a heat exchanger (d1) traversed by a stream of air or a stream of exhaust gas and an expansion valve (d2). The operation of this branch is identical to the second embodiment presented in FIG. 2.

The heat exchangers (43 and 45) are of the air/refrigerant type and the exchangers (48 and 47) are of the liquid/refrigerant type. The operation of these exchangers is identical to the third embodiment presented in FIG. 3.

The operation of the loop according to the fourth embodiment typically corresponds to the combination of the operations of the second and third embodiments as described above. Thus, all the characteristics of these two embodiments apply for this fourth embodiment.

In particular, although FIG. 4 discloses an embodiment with two refrigerant/liquid heat exchangers (47 and 48), the refrigerating loop can comprise either the exchanger (47) or the exchanger (48) (mode not represented in FIG. 4).

The refrigerant/liquid exchanger (47 or 48) can be mounted in series with the heat exchanger (respectively 45 or 43) (as represented diagrammatically in FIG. 4), or in parallel with the latter. When it is mounted in series with the heat exchanger (45 or 43), the exchanger (47 or 48) can be placed before or after the exchanger (45 or 43) in the direction of circulation of the refrigerant.

Figure 5:
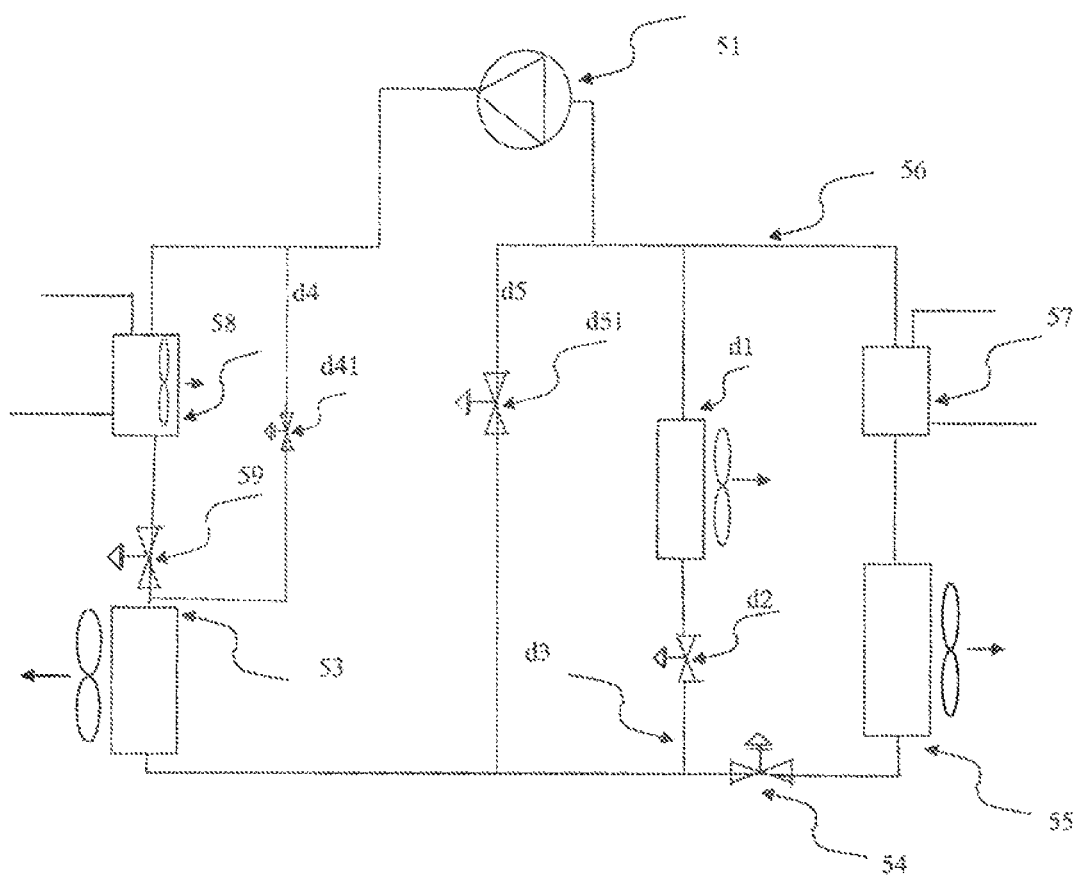
FIG. 5 shows a refrigerating loop according to a fifth embodiment of the invention.
Figure 6:
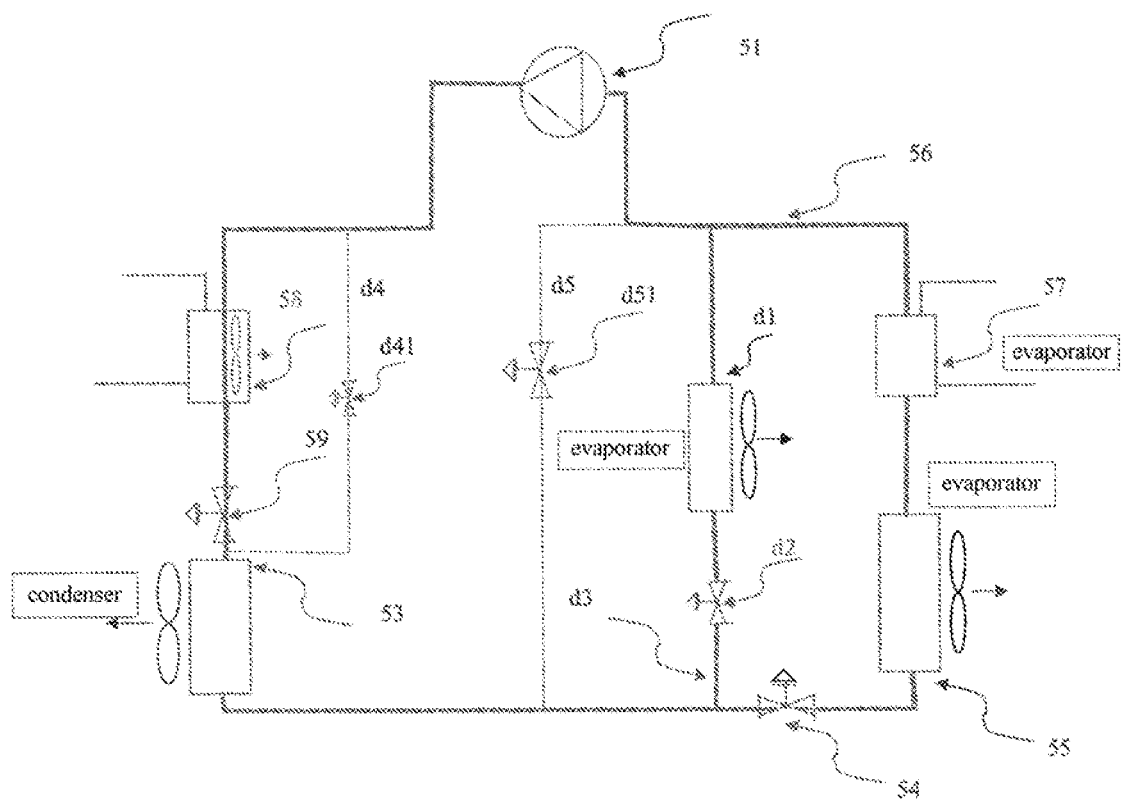
FIG. 6 shows a refrigerating loop according to a fifth embodiment of the invention.
Figure 7:
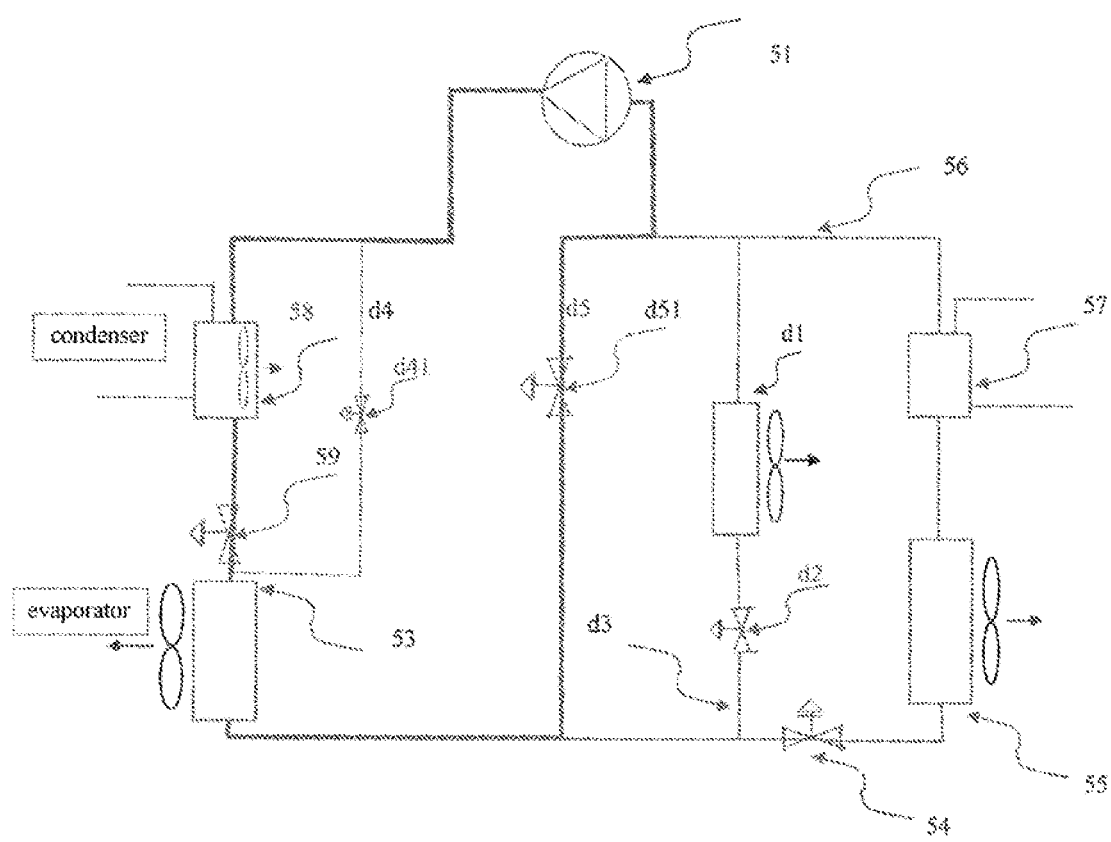
FIG. 7 shows a refrigerating loop according to a fifth embodiment of the invention.

According to a fifth embodiment of the invention, represented diagrammatically by FIGS. 5, 6 and 7, the refrigerating loop (56) comprises a first heat exchanger series (53 and 58), an expansion valve (59), an expansion valve (54), a second heat exchanger series (55 and 57) and a compressor (51).

The loop also comprises a bypass branch (d3) fitted, on the one hand, to the outlet of the exchanger (53) and, on the other hand, to the outlet of the exchanger (57), the circulation of the refrigerant being considered in refrigerating mode. This branch comprises a heat exchanger (d1) traversed by a stream of air or a stream of exhaust gas and an expansion valve (d2). The operation of this branch is identical to the second embodiment presented in FIG. 2.

The refrigerating loop also comprises a bypass branch (d4) comprising a valve (d41) and another bypass branch (d5) comprising a valve (d51).

The heat exchangers (53 and 55) are of the air/refrigerant type, the exchanger (53) preferably being an exterior air/refrigerant exchanger.

The exchanger (57) is of the liquid/refrigerant type. The operation of this exchanger is identical to the exchanger (37) of the third embodiment presented in FIG. 3.

The exchanger (58) is of the liquid/refrigerant or air/refrigerant type.

As indicated above for the third embodiment, FIGS. 5, 6 and 7 disclose embodiments with two heat exchangers (57 and 58). However, according to the abovementioned fifth embodiment, the refrigerating loop can comprise either the exchanger (57) or the exchanger (58). Preferably, the exchanger (57) is not present in the loop.

The exchanger (57 or 58) can be mounted in series with the heat exchanger (respectively 55 or 53) (as represented diagrammatically in FIGS. 5, 6 and 7), or in parallel with the latter. When it is mounted in series with the heat exchanger (55 or 53), the exchanger (57 or 58) can be placed before or after the exchanger (55 or 53) in the direction of circulation of the refrigerant.

FIG. 6 represents the refrigerating mode of the fifth embodiment. In this refrigerating mode, the refrigerant is put in motion by the compressor (51) and passes through:
  either the exchanger (58) (if present) without the latter operating (the refrigerant just passes without the exchanger been put into action) and then the expansion valve (59) without the latter operating (completely open) or else the refrigerant goes through a bypass (not represented in FIGS. 5, 6 and 7) making it possible to circumvent the expansion valve,
  or a valve (not represented in the figures) upstream of the exchanger (58) makes it possible to circumvent the exchanger (58) in order for the refrigerant to go through the bypass (d4) (the valve (d41) being open).

The valve (d51) being closed, the refrigerant subsequently passes through:
  the exchanger (53) acting as condenser (that is to say, gives off heat to the exterior), subsequently the expansion valve (54), then the exchanger (55) acting as evaporator, thus making possible the cooling of the stream of air intended to be forced inside the passenger compartment of the motor vehicle, and optionally the exchanger (57), if present, acting as evaporator, thus making possible the cooling of a liquid which makes it possible, in its turn, to cool the air inside the passenger compartment of the vehicle via another liquid/air heat exchanger; and/or the expansion valve (d2) and then the exchanger (d1) acting as evaporator, making possible, for example, the cooling of the stream of air intended to cool the electric motor and/or the electronic circuit and/or the battery.

FIG. 7 represents the heating mode of the fifth embodiment. In this heating mode, the refrigerant is put in motion by the compressor (51). The valve (d41) being closed, the refrigerant subsequently passes through the exchanger (58) acting as condenser, then the expansion valve (59), and the heat exchanger (53) acting as evaporator. The valves (54) and (d2) being closed, the refrigerant subsequently passes through the bypass (d5) via the open valve (d51).

The heat exchanger (58) acts as condenser and so makes it possible to heat the stream of air intended for the passenger compartment of the motor vehicle (if it is an air/refrigerant exchanger) or else to heat a liquid which makes it possible, in its turn, to heat the stream of air intended for the passenger compartment of the motor vehicle via another liquid/air heat exchanger (if it is a liquid/refrigerant exchanger), it being possible for the same exchanger also to heat the battery, if necessary.

FIGS. 1 to 4 describe embodiments in which the means for inversion of the operation of the reversible loop is a means for inversion of the direction of circulation of the refrigerant, such as, for example, a 4-way valve.

FIGS. 5, 6 and 7 describe embodiments in which the means for inversion of the operation of the reversible loop are shut-off (on/off) valves, in particular making it possible to modify the course of the refrigerant and making possible the inversion of the function of some heat exchangers.

In all the abovementioned embodiments, the systems described can comprise additional shut-off (on/off) valves or bypasses (even if they are not present in FIGS. 1 to 7).

All the embodiments described above can be combined with one another.

In the context of the invention, the term "between x and y" or "from x to y" is understood to mean an interval in which the limits x and y are included. For example, the range "between 1% and 2%" includes in particular the values 1% and 2%.

The following examples illustrate the invention without, however, limiting it.

Experimental Part

In the tables which follow, "$T_x$" denotes the temperature at the location "x", "$P_x$" denotes the pressure of the refrigerant at the location "x" and "% Y/R134a" denotes the percentage of the property "Y" of the refrigerant with respect to the reference refrigerant R134a.

COP: coefficient of performance and is defined, when a heat pump is concerned, as being the useful hot power supplied by the system (CAP) to the power introduced or consumed by the system per unit of displaced volume.

Isentropic efficiency of the compressor: this is the ratio of the actual energy transmitted to the refrigerant to the isentropic energy.

$$\eta = a + b\tau + c\tau^2 + d\tau^3 + e\tau^4$$

η: isentropic effiency
τ: compression ratio
a, h, c and e: constants

The values of the constants a, b, c, d and e are determined according to a typical efficiency curve, according to the "Handbook of Air Conditioning and Refrigeration", Shan K. Wang.

The mixtures according to the invention are as follows:

| Name | R1234yf | R32 | R125 |
|---|---|---|---|
| M1 | 93.5 | 4 | 2.5 |
| M2 | 93.0 | 4 | 3 |
| M3 | 92.5 | 4 | 3.5 |
| M4 | 92.5 | 5 | 2.5 |
| M5 | 92.0 | 5 | 3 |
| M6 | 91.5 | 5 | 3.5 |
| M7 | 91.5 | 6 | 2.5 |
| M8 | 91.0 | 6 | 3 |
| M9 | 90.5 | 6 | 3.5 |

Let there be a reversible heat pump installation which operates between a mean evaporation temperature of between 0° C. and −30° C., a mean condensation temperature at 30° C., a superheating of 17° C. and with an internal exchanger.

Example 1A: Results at 0° C. Mean Evaporation Temperature

| Product | $T_{cond}$ | $T_{evap}$ | $P_{condenser}$ | $P_{evaporator}$ | $T_{evaporator\ inlet}$ | $T_{compressor\ inlet}$ |
|---|---|---|---|---|---|---|
| R134a | 30 | 0 | 7.7 | 2.9 | 0 | 17 |
| M1 | 30 | 0 | 9.1 | 3.6 | −2 | 19 |
| M2 | 30 | 0 | 9.1 | 3.6 | −2 | 19 |
| M3 | 30 | 0 | 9.1 | 3.6 | −2 | 19 |
| M4 | 30 | 0 | 9.3 | 3.8 | −2 | 19 |
| M5 | 30 | 0 | 9.3 | 3.8 | −2 | 19 |
| M6 | 30 | 0 | 9.3 | 3.8 | −2 | 19 |
| M7 | 30 | 0 | 9.6 | 3.8 | −2 | 19 |
| M8 | 30 | 0 | 9.6 | 3.9 | −2 | 19 |
| M9 | 30 | 0 | 9.6 | 3.9 | −2 | 19 |

| Product | $T_{compressor\ outlet}$ | $T_{expansion\ valve\ inlet}$ | Pressure ratio | Isentropic efficiency | % CAP | % COP |
|---|---|---|---|---|---|---|
| R134a | 55 | 19 | 2.63 | 84 | 100 | 100 |
| M1 | 52 | 16 | 2.50 | 84 | 116 | 100 |
| M2 | 52 | 16 | 2.50 | 84 | 116 | 100 |
| M3 | 52 | 16 | 2.50 | 84 | 116 | 100 |
| M4 | 52 | 16 | 2.47 | 83 | 120 | 101 |
| M5 | 52 | 16 | 2.47 | 83 | 120 | 101 |
| M6 | 52 | 16 | 2.47 | 83 | 120 | 101 |
| M7 | 53 | 16 | 2.49 | 84 | 122 | 100 |

-continued

| | | | | | | |
|---|---|---|---|---|---|---|
| M8 | 53 | 16 | 2.49 | 84 | 122 | 100 |
| M9 | 53 | 16 | 2.49 | 84 | 123 | 100 |

Example 1B: Results at −5° C. Mean Evaporation Temperature

| Product | $T_{cond}$ | $T_{evap}$ | $P_{condenser}$ | $P_{evaporator}$ | $T_{evaporator\ inlet}$ | $T_{compressor\ inlet}$ |
|---|---|---|---|---|---|---|
| R134a | 30 | −5 | 7.7 | 2.4 | −5 | 12 |
| M1 | 30 | −5 | 9.1 | 3.1 | −7 | 14 |
| M2 | 30 | −5 | 9.1 | 3.1 | −7 | 14 |
| M3 | 30 | −5 | 9.1 | 3.1 | −7 | 14 |
| M4 | 30 | −5 | 9.3 | 3.1 | −7 | 14 |
| M5 | 30 | −5 | 9.3 | 3.1 | −7 | 14 |
| M6 | 30 | −5 | 9.3 | 3.2 | −7 | 14 |
| M7 | 30 | −5 | 9.6 | 3.2 | −7 | 14 |
| M8 | 30 | −5 | 9.6 | 3.2 | −7 | 14 |
| M9 | 30 | −5 | 9.6 | 3.3 | −7 | 14 |

| Product | $T_{compressor\ outlet}$ | $T_{expansion\ valve\ inlet}$ | Pressure ratio | Isentropic efficiency | % CAP | % COP |
|---|---|---|---|---|---|---|
| R134a | 57 | 20 | 3.16 | 84 | 100 | 100 |
| M1 | 52 | 17 | 2.96 | 84 | 116 | 100 |
| M2 | 52 | 17 | 2.96 | 84 | 117 | 100 |
| M3 | 52 | 17 | 2.96 | 84 | 117 | 100 |
| M4 | 53 | 16 | 2.96 | 84 | 119 | 100 |
| M5 | 53 | 16 | 2.96 | 84 | 120 | 100 |
| M6 | 53 | 16 | 2.94 | 84 | 121 | 100 |
| M7 | 53 | 16 | 2.95 | 84 | 123 | 100 |
| M8 | 53 | 16 | 2.95 | 84 | 123 | 100 |
| M9 | 54 | 16 | 2.95 | 84 | 124 | 100 |

Example 1C: Results at −10° C. Mean Evaporation Temperature

| Product | $T_{cond}$ | $T_{evap}$ | $P_{condenser}$ | $P_{evaporator}$ | $T_{evaporator\ inlet}$ | $T_{compressor\ inlet}$ |
|---|---|---|---|---|---|---|
| R134a | 30 | −10 | 7.7 | 2.0 | −10 | 7 |
| M1 | 30 | −10 | 9.1 | 2.6 | −11 | 9 |
| M2 | 30 | −10 | 9.1 | 2.6 | −11 | 9 |
| M3 | 30 | −10 | 9.1 | 2.6 | −11 | 9 |
| M4 | 30 | −10 | 9.3 | 2.6 | −12 | 9 |
| M5 | 30 | −10 | 9.3 | 2.6 | −12 | 9 |
| M6 | 30 | −10 | 9.3 | 2.6 | −12 | 9 |
| M7 | 30 | −10 | 9.5 | 2.7 | −12 | 9 |
| M8 | 30 | −10 | 9.5 | 2.7 | −12 | 9 |
| M9 | 30 | −10 | 9.6 | 2.7 | −12 | 9 |

| Product | $T_{compressor\ outlet}$ | $T_{expansion\ valve\ inlet}$ | Pressure ratio | Isentropic efficiency | % CAP | % COP |
|---|---|---|---|---|---|---|
| R134a | 58 | 20 | 3.84 | 83 | 100 | 100 |
| M1 | 53 | 17 | 3.54 | 84 | 117 | 100 |
| M2 | 53 | 17 | 3.54 | 84 | 118 | 100 |
| M3 | 53 | 17 | 3.54 | 84 | 118 | 100 |
| M4 | 53 | 16 | 3.54 | 84 | 120 | 100 |
| M5 | 53 | 16 | 3.53 | 84 | 121 | 100 |
| M6 | 53 | 16 | 3.53 | 84 | 121 | 100 |
| M7 | 54 | 16 | 3.52 | 84 | 124 | 100 |
| M8 | 54 | 16 | 3.52 | 84 | 124 | 100 |
| M9 | 54 | 16 | 3.52 | 84 | 124 | 100 |

Example 1D: Results at −20° C. Mean Evaporation Temperature

| Product | $T_{cond}$ | $T_{evap}$ | $P_{condenser}$ | $P_{evaporator}$ | $T_{evaporator\ inlet}$ | $T_{compressor\ inlet}$ |
|---|---|---|---|---|---|---|
| R134a | 30 | −20 | 7.7 | 1.3 | −20 | −3 |
| M1 | 30 | −20 | 9.0 | 1.7 | −21 | −2 |
| M2 | 30 | −20 | 9.1 | 1.7 | −21 | −2 |
| M3 | 30 | −20 | 9.1 | 1.7 | −21 | −2 |
| M4 | 30 | −20 | 9.3 | 1.8 | −21 | −2 |
| M5 | 30 | −20 | 9.3 | 1.8 | −21 | −2 |
| M6 | 30 | −20 | 9.3 | 1.8 | −21 | −2 |
| M7 | 30 | −20 | 9.6 | 1.8 | −22 | −1 |
| M8 | 30 | −20 | 9.6 | 1.8 | −22 | −1 |
| M9 | 30 | −20 | 9.6 | 1.8 | −22 | −1 |

| Product | $T_{compressor\ outlet}$ | $T_{expansion\ valve\ inlet}$ | Pressure ratio | Isentropic efficiency | % CAP | % COP |
|---|---|---|---|---|---|---|
| R134a | 65 | 20 | 5.80 | 79 | 100 | 100 |
| M1 | 55 | 17 | 5.25 | 81 | 117 | 101 |
| M2 | 55 | 17 | 5.25 | 81 | 118 | 101 |
| M3 | 55 | 17 | 5.25 | 81 | 118 | 101 |
| M4 | 56 | 17 | 5.23 | 81 | 121 | 101 |
| M5 | 56 | 17 | 5.23 | 81 | 121 | 101 |
| M6 | 56 | 17 | 5.22 | 81 | 122 | 101 |
| M7 | 57 | 17 | 5.26 | 81 | 124 | 100 |
| M8 | 57 | 17 | 5.26 | 81 | 124 | 100 |
| M9 | 57 | 17 | 5.26 | 81 | 125 | 100 |

Example 1E: Results at −30° C. Mean Evaporation Temperature

| Product | $T_{cond}$ | $T_{evap}$ | $P_{condenser}$ | $P_{evaporator}$ | $T_{evaporator\ inlet}$ | $T_{compressor\ inlet}$ |
|---|---|---|---|---|---|---|
| R134a | 30 | −30 | 7.7 | 0.8 | −30 | −13 |
| M1 | 30 | −30 | 9.1 | 1.1 | −31 | −12 |
| M2 | 30 | −30 | 9.1 | 1.1 | −31 | −12 |
| M3 | 30 | −30 | 9.1 | 1.1 | −31 | −12 |
| M4 | 30 | −30 | 9.3 | 1.2 | −31 | −12 |
| M5 | 30 | −30 | 9.3 | 1.2 | −31 | −12 |
| M6 | 30 | −30 | 9.3 | 1.2 | −31 | −12 |
| M7 | 30 | −30 | 9.6 | 1.2 | −31 | −11 |
| M8 | 30 | −30 | 9.6 | 1.2 | −31 | −11 |
| M9 | 30 | −30 | 9.6 | 1.2 | −31 | −11 |

| Product | $T_{compressor\ outlet}$ | $T_{expansion\ valve\ inlet}$ | Pressure ratio | Isentropic efficiency | % CAP | % COP |
|---|---|---|---|---|---|---|
| R134a | 81 | 21 | 9.11 | 69 | 100 | 100 |
| M1 | 65 | 18 | 8.05 | 72 | 118 | 102 |
| M2 | 65 | 18 | 8.04 | 72 | 119 | 102 |
| M3 | 65 | 18 | 8.04 | 72 | 119 | 102 |
| M4 | 66 | 17 | 8.02 | 72 | 121 | 102 |
| M5 | 66 | 17 | 8.02 | 72 | 122 | 102 |
| M6 | 66 | 17 | 8.02 | 72 | 122 | 102 |
| M7 | 67 | 17 | 7.96 | 72 | 126 | 103 |
| M8 | 67 | 17 | 7.96 | 72 | 126 | 103 |
| M9 | 67 | 17 | 7.95 | 72 | 126 | 103 |

It emerges from examples 1A to 1E that the mixtures according to the invention show a greater pressure at the evaporator than the pressure of HFC-134a, which helps in limiting the infiltration of air inside the system, in particular when this system operates at low temperature, for example at a temperature in the evaporator of 0° C., −5° C., −10° C., −20° C. and −30° C.

For one and the same compressor, the mixtures of the invention are advantageously more effective than HFC-134a. This is because the examples above show that the mixtures of the invention result in an efficiency at the compressor similar to or greater than that of HFC-134a, a better capacity and an identical, indeed even better, COP.

The invention claimed is:

1. A process for heating and/or air conditioning a motor vehicle passenger compartment using a reversible refrigerating loop, in which a refrigerant circulates, comprising a first heat exchanger, an expansion valve, a second heat exchanger, a compressor and means for inversion of the operation of the reversible refrigerating loop, wherein the refrigerant comprises:

from 4% to 6% by weight of difluoromethane;
from 2.5% to 3.5% by weight of pentafluoroethane; and
from 91% to 93.5% by weight of tetrafluoropropene.

2. The process as claimed in claim 1, in which the refrigerant comprises:
from 4.5% to 5.5% by weight of difluoromethane;
from 2.5% to 3.5% by weight of pentafluoroethane; and
from 91% to 93% by weight of tetrafluoropropene.

3. The process as claimed in claim 1, in which the refrigerant comprises:
from 4.5% to 5.5% by weight of difluoromethane;
from 2.5% to 3.5% by weight of pentafluoroethane; and
from 91.5% to 93% by weight of tetrafluoropropene.

4. The process as claimed in claim 1, in which the refrigerant comprises:
from 4.5% to 5.5% by weight of difluoromethane;
from 3% to 3.5% by weight of pentafluoroethane; and
from 91% to 92% by weight of tetrafluoropropene.

5. The process as claimed in claim 4, in which the tetrafluoropropene is 2,3,3,3-tetrafluoropropene.

6. The process as claimed in claim 1, in which the refrigerant is chosen from the group consisting of:
5% by weight of difluoromethane, 3.3% by weight of pentafluoroethane and 91.7% by weight of tetrafluoropropene;
5% by weight of difluoromethane, 3% by weight of pentafluoroethane and 92% by weight of tetrafluoropropene;
5% by weight of difluoromethane, 3.1% by weight of pentafluoroethane and 91.9% by weight of tetrafluoropropene;
5% by weight of difluoromethane, 3.2% by weight of pentafluoroethane and 91.8% by weight of tetrafluoropropene;
6% by weight of difluoromethane, 3% by weight of pentafluoroethane and 91% by weight of tetrafluoropropene; and
6% by weight of difluoromethane, 2.5% by weight of pentafluoroethane and 91.5% by weight of tetrafluoropropene.

7. The process as claimed in claim 1, in which the refrigerant has a GWP of less than 1500.

8. The process as claimed in claim 1, in which the refrigerant has a lower flammability limit of greater than 285 g/m$^3$.

9. The process as claimed in claim 1, in which the refrigerant has a flame propagation rate of less than 2 cm/s.

10. The process as claimed in claim 1, wherein the first and second exchangers are of the air/refrigerant type.

11. The process as claimed in claim 1, wherein the refrigerating loop is thermally coupled with a cooling circuit of an engine and/or of an electronic circuit.

12. The process as claimed in claim 1, wherein the first heat exchanger is traversed both by the refrigerant and by exhaust gases resulting from a heat engine of the motor vehicle or by heat resulting from a battery or from an electronic circuit of the motor vehicle.

13. The process as claimed in claim 1, wherein the loop can comprise, as a bypass, at least one heat exchanger in thermal communication with a stream of air, intended to be admitted inside a heat engine of the motor vehicle, or with exhaust gases resulting from the motor vehicle heat engine, and/or with heat resulting from an electric motor and/or from an electronic circuit and from a battery of an electric motor vehicle.

14. The process as claimed in claim 1, wherein the refrigerating loop is installed in the motor vehicle for the recovery of energy from a heat engine and/or from an electric battery.

15. A device comprising the reversible refrigerating loop as claimed in claim 1.

16. The process as claimed in claim 1, in which the tetrafluoropropene is 2,3,3,3-tetrafluoropropene.

17. The process as claimed in claim 1, in which the refrigerant is chosen from the group consisting of:
5% by weight of difluoromethane, 3.3% by weight of pentafluoroethane and 91.7% by weight of 2,3,3,3-tetrafluoropropene;
5% by weight of difluoromethane, 3% by weight of pentafluoroethane and 92% by weight of 2,3,3,3-tetrafluoropropene;
5% by weight of difluoromethane, 3.1% by weight of pentafluoroethane and 91.9% by weight of 2,3,3,3-tetrafluoropropene;
5% by weight of difluoromethane, 3.2% by weight of pentafluoroethane and 91.8% by weight of 2,3,3,3-tetrafluoropropene;
6% by weight of difluoromethane, 3% by weight of pentafluoroethane and 91% by weight of 2,3,3,3-tetrafluoropropene; and
6% by weight of difluoromethane, 2.5% by weight of pentafluoroethane and 91.5% by weight of 2,3,3,3-tetrafluoropropene.

18. The process as claimed in claim 1, wherein the process prevents air from entering the evaporator of the refrigerating loop on starting up the compressor when an external temperature is −12° C.

19. The process as claimed in claim 1, wherein the process prevents air from entering the evaporator of the refrigerating loop on starting up the compressor when an external temperature is −29° C.

20. The process as claimed in claim 1, wherein the process prevents air from entering the evaporator of the refrigerating loop on starting up the compressor when a temperature at the evaporator is −15° C.

21. The process as claimed in claim 1, wherein the process prevents air from entering the evaporator of the refrigerating loop on starting up the compressor when a temperature at the evaporator is −32° C.

* * * * *